US008991533B2

(12) United States Patent
Abe et al.

(10) Patent No.: US 8,991,533 B2
(45) Date of Patent: Mar. 31, 2015

(54) AIR CLEANER DEVICE

(75) Inventors: Ryuichi Abe, Wako (JP); Takaaki Shomura, Wako (JP); Hidetoshi Miyazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 566 days.

(21) Appl. No.: 13/052,285

(22) Filed: Mar. 21, 2011

(65) Prior Publication Data

US 2011/0232982 A1 Sep. 29, 2011

(30) Foreign Application Priority Data

Mar. 23, 2010 (JP) ................................ 2010-066377

(51) Int. Cl.

| | |
|---|---|
| ***B62D 61/02*** | (2006.01) |
| ***B60K 13/02*** | (2006.01) |
| ***F02M 35/16*** | (2006.01) |
| ***F02M 35/02*** | (2006.01) |
| ***F02M 35/024*** | (2006.01) |
| ***F02M 35/04*** | (2006.01) |

(52) U.S. Cl.

CPC ......... *F02M 35/162* (2013.01); *F02M 35/0203* (2013.01); *F02M 35/024* (2013.01); *F02M 35/04* (2013.01)

USPC .......................... 180/68.1; 180/218; 180/219

(58) Field of Classification Search

CPC ........ B60K 17/36; B60K 13/02; B62K 11/00; B62K 25/283; B62D 1/02

USPC ........ 180/68.3, 218–220, 225–227, 229, 230, 180/350, 357, 366, 373

See application file for complete search history.

(56) References Cited

U.S. PATENT DOCUMENTS

| | | | | |
|---|---|---|---|---|
| 4,778,029 | A * | 10/1988 | Thornburgh | 181/229 |
| 4,890,586 | A * | 1/1990 | Fujii et al. | 123/184.55 |
| 5,040,632 | A * | 8/1991 | Fujii et al. | 180/219 |
| 5,172,788 | A * | 12/1992 | Fujii et al. | 180/219 |
| 5,291,067 | A * | 3/1994 | Nakajima et al. | 307/9.1 |
| 5,609,658 | A * | 3/1997 | Takemura et al. | 55/385.3 |
| 6,231,630 | B1 * | 5/2001 | Ernst et al. | 55/385.3 |
| 7,066,135 | B2 * | 6/2006 | Ishikawa et al. | 123/198 E |
| 7,134,706 | B2 * | 11/2006 | Michisaka et al. | 296/97.22 |
| 7,353,902 | B2 * | 4/2008 | Noda | 180/219 |
| 7,353,903 | B2 * | 4/2008 | Miyabe et al. | 180/219 |
| 7,377,552 | B2 * | 5/2008 | Miyabe | 280/835 |
| 7,614,380 | B2 * | 11/2009 | Tsutsui et al. | 123/184.57 |
| 7,640,909 | B2 * | 1/2010 | Sudoh et al. | 123/184.55 |
| 7,849,947 | B2 * | 12/2010 | Morita | 180/219 |
| 7,985,271 | B2 * | 7/2011 | Nobuhira | 55/385.3 |
| 8,146,693 | B2 * | 4/2012 | Oohashi et al. | 180/68.3 |
| 2004/0187453 | A1 | 9/2004 | Kuji et al. | |

FOREIGN PATENT DOCUMENTS

| | | | |
|---|---|---|---|
| EP | 1526273 | A2 | 4/2005 |
| JP | 59-049764 | U | 4/1984 |
| JP | 05-026124 | | 2/1993 |
| JP | 11-351084 | A | 12/1999 |
| JP | 3466072 | | 8/2003 |
| JP | 2009-190642 | A | 8/2009 |
| WO | 2011 024368 | A1 | 3/2011 |

* cited by examiner

*Primary Examiner* — J. Allen Shriver, II
*Assistant Examiner* — Travis Coolman
(74) *Attorney, Agent, or Firm* — Squire Patton Boggs (US) LLP

(57) ABSTRACT

An air cleaner device includes an air cleaner case having a case main unit and a cover. An intake duct is disposed on the cover, and an intake path is disposed on the case main unit. An air cleaner element is formed in a position biased on a side of the cover relative to fastening surfaces of the case main unit and the cover. The cover and the air cleaner element are integrally removable relative to the case main unit.

12 Claims, 7 Drawing Sheets

AIR CLEANER DEVICE

BACKGROUND

1. Field

The present invention relates an air cleaner device.

2. Description of the Related Art

A known air cleaner device is shown in Japanese Patent No. 3,466,702, and includes an air cleaner case and an air cleaner element, the air cleaner case including a case main unit and a cover and the air cleaner element being disposed in a position biased on the side of the cover relative to a fastening surface between the case main unit and the cover. In such an air cleaner device, the air cleaner element has a peripheral edge portion fitted via a seal into a peripheral groove formed in each of peripheral edge portions of an upward opening portion in the case main unit and a downward opening portion in the cover and the case main unit is tightly integrated with the cover with screws tightened into each mounting hole therein.

PRIOR ART DOCUMENT

Patent Document

In the air cleaner device disclosed in Japanese Patent No. 3,466,072 (Patent Document 1), when the air cleaner element is to be replaced with a new one or when the air cleaner device otherwise needs servicing, it is necessary to raise the cover to a level higher than a height of the air cleaner element before the cover can be removed after the screws have been removed. This requires a working space for at least the height of the air cleaner element in a direction to detach the cover, such as upward. Consequently, a vehicle mounted with the known air cleaner device is restricted in parts layout and may need to be much larger in size because of the requirement for the space for servicing around the air cleaner case.

SUMMARY

The present invention has been made in view of the foregoing situations; it is an object of the present invention to provide an air cleaner device that can improve maintainability without having to build a vehicle unnecessarily large.

To achieve the foregoing object, a first aspect of the present invention provides an air cleaner device which can include an air cleaner case that includes a case main unit and a cover and an intake duct disposed on the cover. An intake path can be disposed on the case main unit and connected to an engine, An air cleaner element can be formed in a position biased on a side of the cover relative to fastening surfaces of the case main unit and the cover. In this air cleaner device, the cover and the air cleaner element are integrally removable relative to the case main unit.

In a second aspect of the present invention, in addition to the arrangements of the first aspect of the present invention, the cover and the air cleaner element can be integrally held by a plurality of holding portions.

In a third aspect of the present invention, in addition to the arrangements of the first or second aspect of the present invention, the holding portions can be disposed at three places.

In a fourth aspect of the present invention, in addition to the arrangements of any one of the first to third aspects of the present invention, the holding portions can be disposed, when mounted in a vehicle, at a front surface central portion and left and right side surfaces of the cover and the air cleaner element.

In a fifth aspect of the present invention, in addition to the arrangements of any one of the first to fourth aspects of the present invention, the cover can have a drain portion disposed at part of a peripheral edge portion of the cover, the drain portion for discharging or draining any fluid which may accumulate therein. The air cleaner element and the case main unit have drain holes formed in peripheral edge portions thereof, the drain holes communicating with the drain portion.

In a sixth aspect of the present invention, in addition to the arrangements of any one of the first to fifth aspects of the present invention, the air cleaner case can be disposed, when mounted in a vehicle, in an inclined position such that a rear portion thereof is disposed downwardly of a front portion thereof. The drain portion and the drain holes are disposed at the rear portion of the air cleaner case.

In a seventh aspect of the present invention, in addition to the arrangements of any one of the first to sixth aspects of the present invention, a vehicle on which the air cleaner device is mounted can include a side stand disposed on one side thereof in a vehicle width direction. The drain portion and the drain holes are disposed on the same side as the side stand.

In an eighth aspect of the present invention, in addition to the arrangements of any one of the first to seventh aspects of the present invention, when mounted in the vehicle, the air cleaner case can be disposed forwardly of a storage box. The air cleaner case is disposed downwardly in a perpendicular direction of a front end of an upper portion of the storage box.

In the first aspect of the present invention, the air cleaner device includes the air cleaner element formed in a position biased on the side of the cover relative to the fastening surfaces of the case main unit and the cover. The air cleaner case also allows the cover and the air cleaner element to be integrally removed or reinstalled relative to the case main unit. Therefore, even if there is little space available upwardly of the cover and accordingly the cover cannot be raised, the cover and the air cleaner element can be removed or reinstalled relative to the case main unit by simply slidingly moving the cover and the air cleaner element integrally in the width direction. This eliminates the need for having a large space for servicing around the air cleaner case, so that the parts can be compactly configured or disposed. The vehicle can therefore be prevented from becoming unnecessarily large in size, and maintainability of the air cleaner device can be improved.

In the second aspect of the present invention, the cover and the air cleaner element can be integrally held by a plurality of holding portions. The cover and the air cleaner element can therefore be reliably removed or reinstalled, while preventing the cover and the air cleaner element from deviating from each other.

In the third aspect of the present invention, the holding portions can be disposed at three places, so that the cover and the air cleaner element can be even more reliably removed or reinstalled relative to the case main unit.

In the fourth aspect of the present invention, the holding portions can be disposed, when mounted in a vehicle, at a front surface central portion and left and right side surfaces of the cover and the air cleaner element. This allows an operator to slidingly move the cover and the air cleaner element by supporting with both hands the holding portions on both side surfaces, with the cover and the air cleaner element engaged with each other using the holding portions at the front central portion. This achieves good maintainability of the air cleaner device without having a large space for servicing around the air cleaner case.

In the fifth aspect of the present invention, the cover can have a drain portion for draining or discharging fluid, disposed at part of a peripheral edge portion of the cover and the air cleaner element and the case main unit have drain holes formed communicating with the drain portion in peripheral edge portions thereof. Fluid can therefore be efficiently discharged without having to incorporate a drain part separately. In addition, the drain portion or the drain hole disposed in the peripheral edge portion of the cover, the air cleaner element, or the case main unit, no restriction is therefore imposed on the size of the filter portion disposed at the central portion of the air cleaner element.

In the sixth aspect of the present invention, the air cleaner case is disposed, when mounted in a vehicle, in an inclined position such that the rear portion thereof is disposed downwardly of the front portion thereof and the drain portion and the drain holes are disposed at the rear portion of the air cleaner case. This allows drain in the air cleaner case to be efficiently collected in the rear portion thereof. Drain can therefore be efficiently discharged by disposing the minimum essential drain portion and the drain holes in the rear portion of the air cleaner case.

In the seventh aspect of the present invention, the side stand is disposed on the one side of the vehicle in which the air cleaner device is mounted and the drain portion and the drain holes are disposed on the same side as the side stand. When the side stand is deployed, the vehicle is inclined to the side of the side stand and the air cleaner device is also inclined to the side of the side stand. As compared with an arrangement in which the drain portion and the drain holes are disposed on the side opposite to the side stand, draining performance can be improved.

In the eighth aspect of the present invention, when the air cleaner device is mounted in the vehicle, the storage box is disposed rearwardly of the air cleaner case and the air cleaner case is disposed downwardly in the perpendicular direction of a front end of an upper portion of the storage box. Therefore, the air cleaner case can be compactly disposed without allowing the same to protrude upwardly from the storage box, while a storage space is secured in the storage box. This makes for improved design efficiency and appearance.

DETAILED DESCRIPTION

Figure 1:
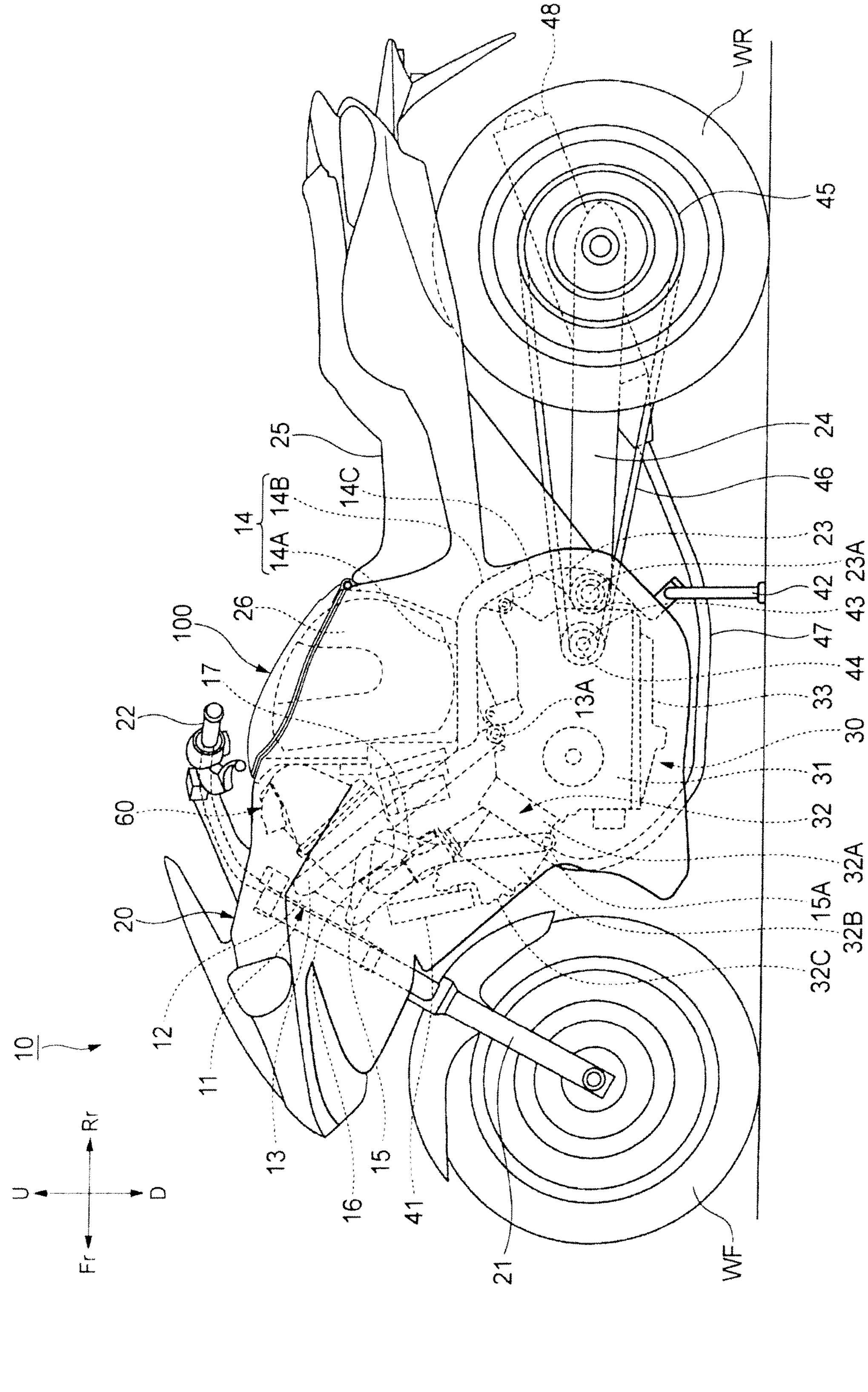
FIG. 1 is a left side elevational view for illustrating a motorcycle in which one embodiment of an air cleaner device according to the present invention is mounted.

One preferred embodiment of an air cleaner device to which the present invention is applied will be described in detail below, with reference to the accompanying drawings. The drawings should be viewed in the direction of reference symbols. Throughout the descriptions given hereunder, expressions indicating directions including front and rear, right and left, and upper and lower mean the same directions as those as viewed from a rider. In the drawings, an arrow Fr indicates forward of the vehicle, an arrow Rr indicates rearward of the vehicle, an arrow L indicates leftward of the vehicle, an arrow R indicates rightward of the vehicle, an arrow U indicates upward of the vehicle, and an arrow D indicates downward of the vehicle.

Referring to FIG. 1, a motorcycle 10 includes a vehicle body frame 11 which is covered, at least in part, in a vehicle body cover or fairing 20, for example, made of a synthetic resin.

The vehicle body frame 11 can include a head pipe 12, a pair of left and right main frames 13, a pair of left and right center frames 14, and a pair of left and right down frames 15. Specifically, the head pipe 12 is disposed at a front end of the vehicle body frame 11. The main frames 13 extend obliquely downwardly toward the rear from the left and right of an upper portion of the head pipe 12. The center frames 14 extend horizontally toward the rear from rear ends of the main frames 13 and are then bent in a rearwardly protruding condition to extend downwardly. The down frames 15 extend obliquely downwardly toward the rear from the left and right of a lower portion of the head pipe 12. The vehicle body frame 11 further includes, though not shown, a pair of left and right seat stays and a pair of left and right middle frames extending rearwardly from rear upper portions and rear end portions, respectively, of the center frames 14 and having respective rear ends connected to each other.

The head pipe 12 can support a pair of left and right front forks 21 steerably to the right and left. The front forks 21 extend downwardly to journal a front wheel WF at lower ends thereof. A steering handlebar 22 is connected to upper portions of the front forks 21. A pivot plate 23 is disposed on the center frames 14. The pivot plate 23 rotatably supports a front end of a rear fork 24 via a pivot bolt 23 Å. The rear fork 24 journals a rear wheel WR at a rear end thereof and is vertically swingably supported via a rear cushion not shown.

An occupant seat 25 can be disposed upwardly of the pair of left and right seat stays. The occupant seat 25 integrates a rider's seat with a pillion. Though not shown, a fuel tank can be disposed between rear portions (between the seat stays and the middle frames) of the vehicle body frame 11.

First and second reinforcement frames 16, 17 are disposed between the main frames 13 and the down frames 15 that are disposed vertically wide apart. The first and the second reinforcement frames 16, 17 connect between the main frame 13 and the down frame 15. Specifically, the first reinforcement frame 16 can extend rearwardly from a front end portion of the down frame 15 to connect between the down frame 15 and the main frame 13. The second reinforcement frame 17 extends downwardly from the main frame 13 at a position near a rear end of the first reinforcement frame 16 to thereby connect between the main frame 13 and the down frame 15.

An engine or power unit 30 can be supported downwardly of the main frames 13 and horizontal portions 14A of the center frames 14, and forwardly of downward extensions 14B of the center frames 14. In this example, the engine 30 is a water-cooled, parallel two-cylinder engine, including a cylinder portion 32 that is inclined upwardly toward the front from a front upper portion of a crankcase 31. As with other aspects of the vehicle in this embodiment of the invention, other engine or power unit configurations could be applicable. The engine 30 is supported as detailed below. Specifically, the front upper portion of the crankcase 31 is supported by rear end portions 13A of the left and right main frames 13, a rear upper portion of the crankcase 31 is supported by a pair of left and right engine hangers 14C disposed between the horizontal portions 14A and the downward extensions 14B of the center frames 14, and the cylinder portion 32 is supported by rear end portions 15A of the left and right down frames 15.

The cylinder portion 32 includes a cylinder block 32A, a cylinder head 32B, and a cylinder head cover 32C. Specifically, the cylinder block 32A is connected to the front upper portion of the crankcase 31. The cylinder head 32B is connected to an upper portion of the cylinder block 32A. The cylinder head cover 32C covers an upper portion of the cylinder head 32B. In addition, an oil pan 33 is connected to a lower end portion of the crankcase 31. A radiator 41 is disposed forwardly of the cylinder head cover 32C. A side stand 42 is attached to a lower end portion of the center frame 14 on the left side of the vehicle.

A rotatable or rotating driving force outputted from the engine 30 is transmitted to the rear wheel WR, in this example, via an output shaft 43 provided in a protruding condition on the left side surface of a rear portion of the crankcase 31, a drive sprocket 44 mounted on the output shaft 43, a driven sprocket 45 mounted on the left side of the rear wheel WR, and a drive chain 46 trained across the drive sprocket 44 and the driven sprocket 45.

Figure 2:
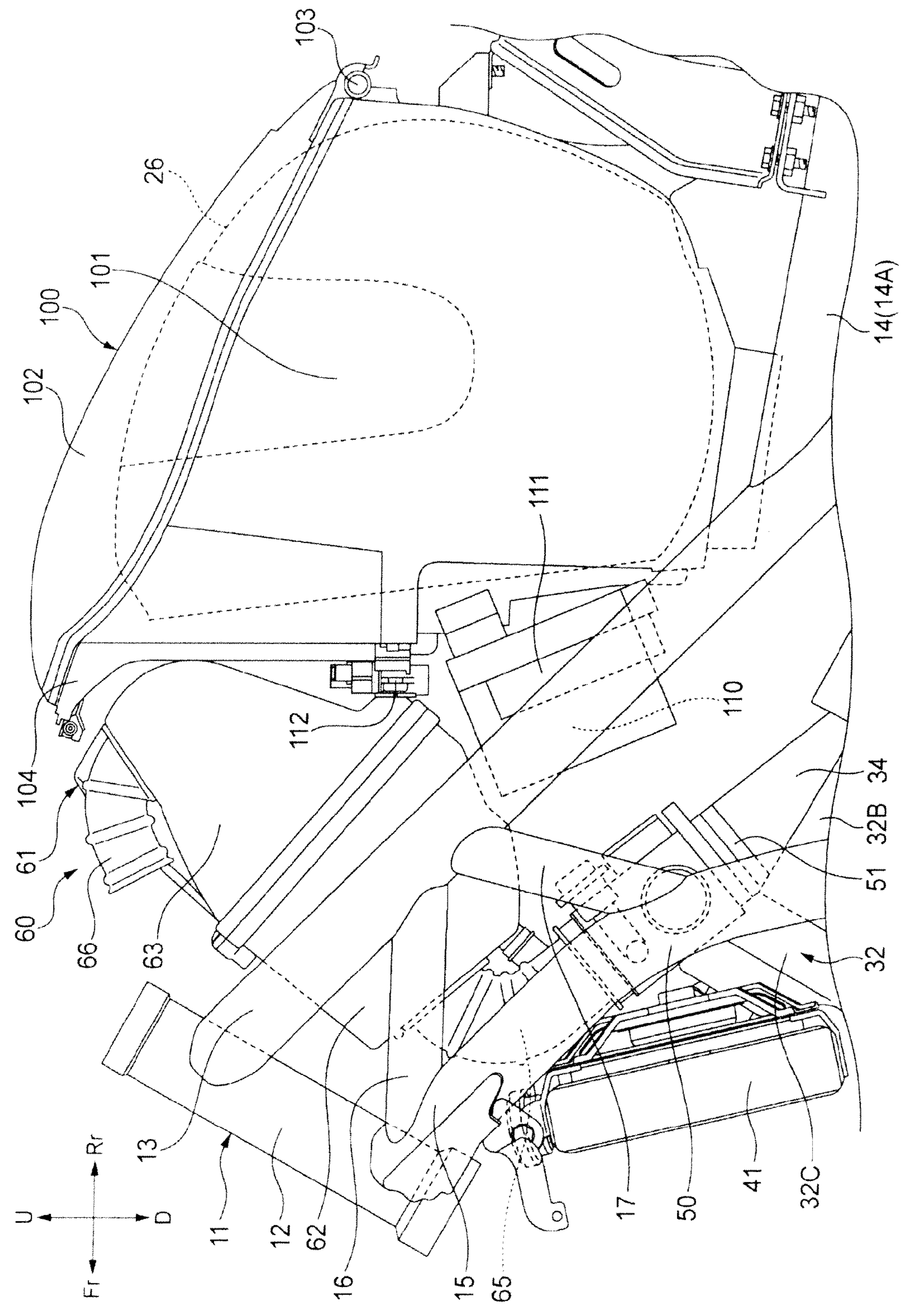
FIG. 2 is a left side elevational view showing the air cleaner device and a storage box shown in FIG. 1.

Referring to FIGS. 1 and 2, a throttle body 50 and an air cleaner device 60 making up an engine air intake system can be connected in sequence to a back surface of the cylinder head 32B. An exhaust pipe 47 and a muffler 48 making up an engine exhaust system are connected in sequence to a front surface of the cylinder head 32B.

The throttle body 50 is mounted via an insulator 51 on an intake manifold portion 34 that is formed on the back surface of the cylinder head 32B. The air cleaner device 60 is connected to an upstream end of the throttle body 50.

Figure 3:
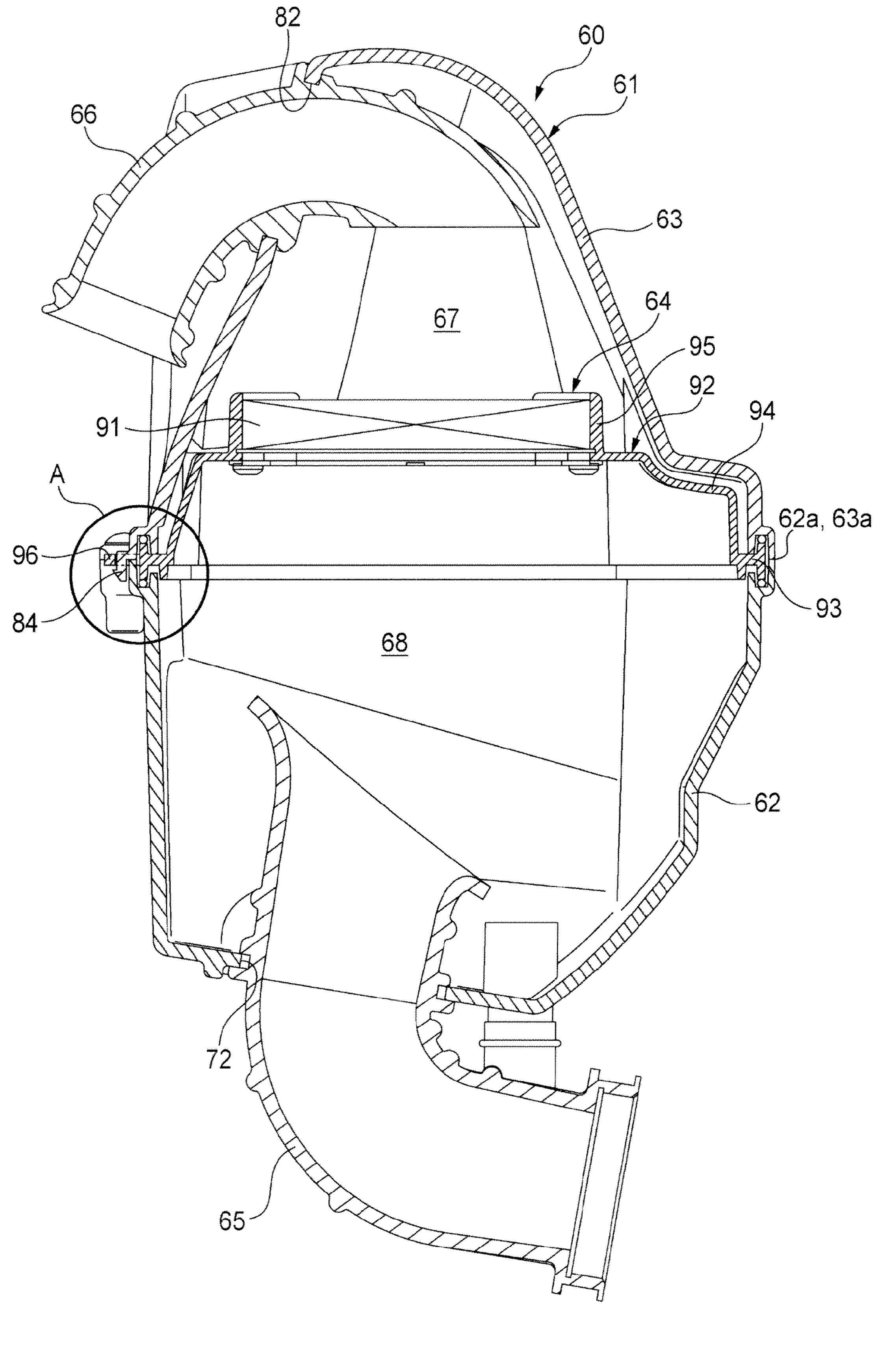
FIG. 3 is a longitudinal cross-sectional view showing the air cleaner device shown in FIG. 2.

Referring to FIGS. 2 and 3, the air cleaner device 60, disposed upwardly of the throttle body 50, can include an air cleaner case 61, an air cleaner element 64, an intake tube (intake path) 65, and an intake duct 66. More specifically, the air cleaner case 61 includes a case main unit 62 and a cover 63, the case main unit 62 forming a lower half and the cover 63 forming an upper half. The air cleaner element 64 is clamped between the case main unit 62 and the cover 63. The air cleaner element 64 removes dust and dirt from an intake air. The intake tube 65 is disposed on a lower surface of the case main unit 62, connecting the upstream end of the throttle body 50 and the air cleaner case 61. The intake duct 66 is disposed on a front surface of the cover 63, guiding the intake air into the air cleaner case 61. In addition, the air cleaner case 61 is disposed in an inclined position such that a rear portion thereof is disposed downwardly of a front portion thereof in a vehicle side view.

The air cleaner case 61 can be partitioned into upper and lower halves by the air cleaner element 64. An upper space above the air cleaner element 64 forms a dirty room or dirty section 67 to which intake air guided into the intake duct 66 is supplied. A lower space below the air cleaner element 64 forms a clean room or clean section 68 to which intake air from which dust and dirt are removed is supplied.

Figure 4:
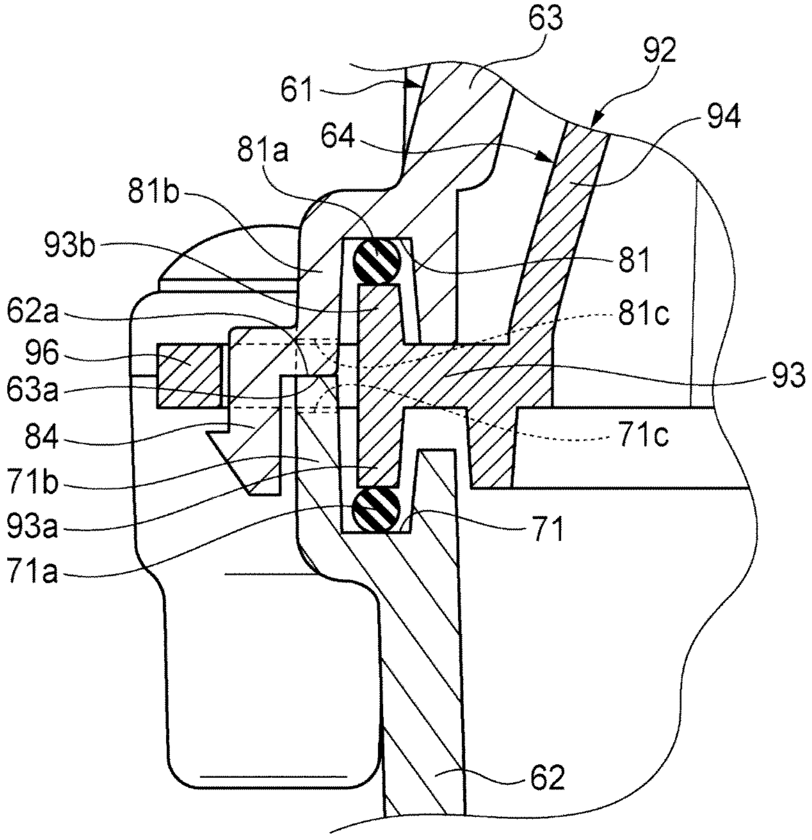
FIG. 4 is an enlarged view showing part A shown in FIG. 3.
Figure 5:
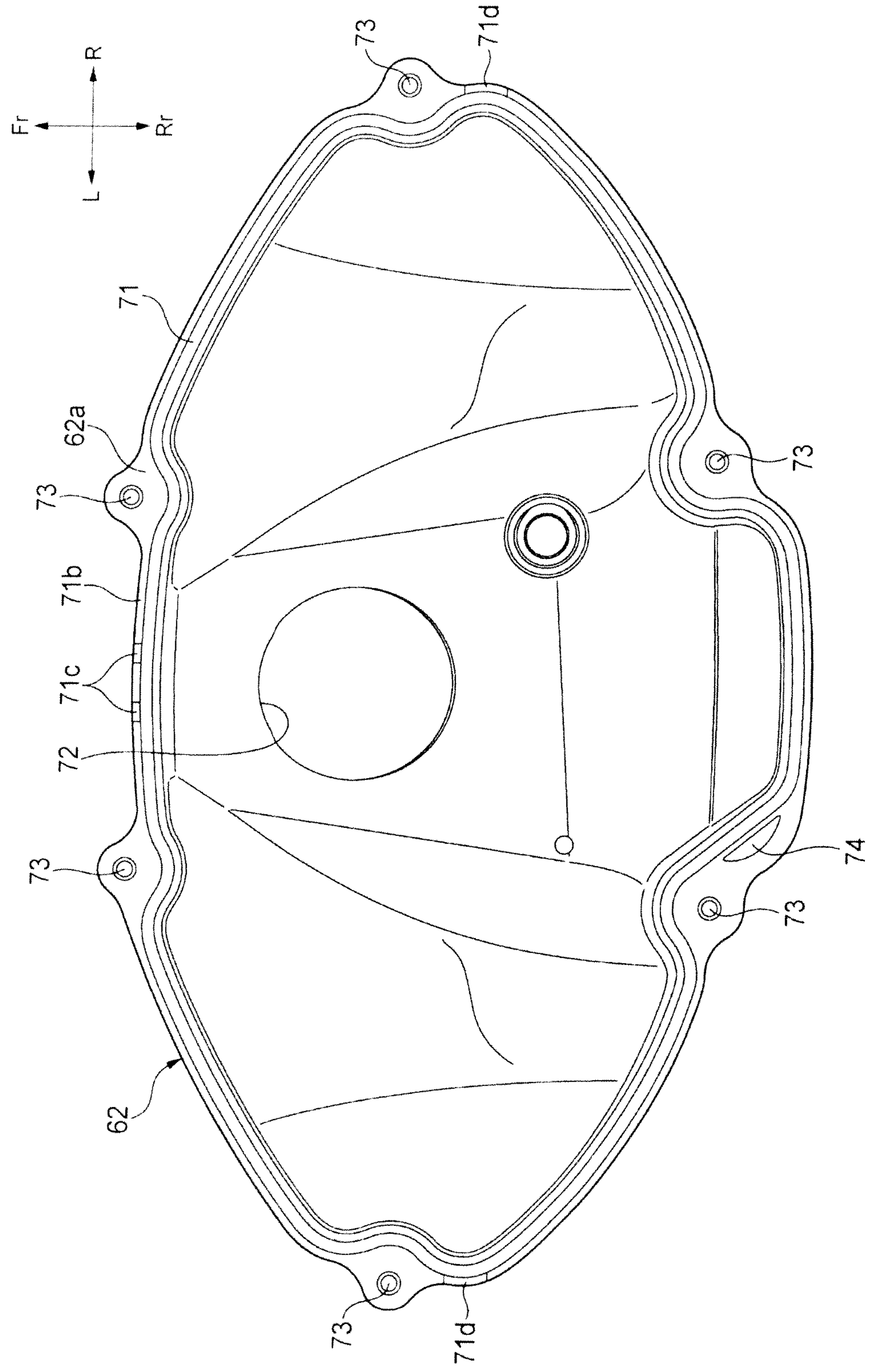
FIG. 5 shows a case main unit shown in FIG. 3, as viewed from above.

Referring to FIGS. 3 to 5, in this example, the case main unit 62 has a bottom and can be shaped substantially into an ellipse in an upward-looking view. The case main unit 62 includes a fastening surface 62*a* to be fastened to the cover 63 on a peripheral edge portion thereof. The fastening surface 62*a* has a peripheral groove 71 in which a lower protruding portion 93*a* formed along a peripheral edge portion of the air cleaner element 64 to be described later is fitted. In FIG. 5, reference symbol 72 denotes a tube mounting hole for mounting the intake tube 65 and reference symbol 73 denotes six internally threaded portions into which screws are threaded for fastening the cover 63 to the case main unit 62.

Figure 6:
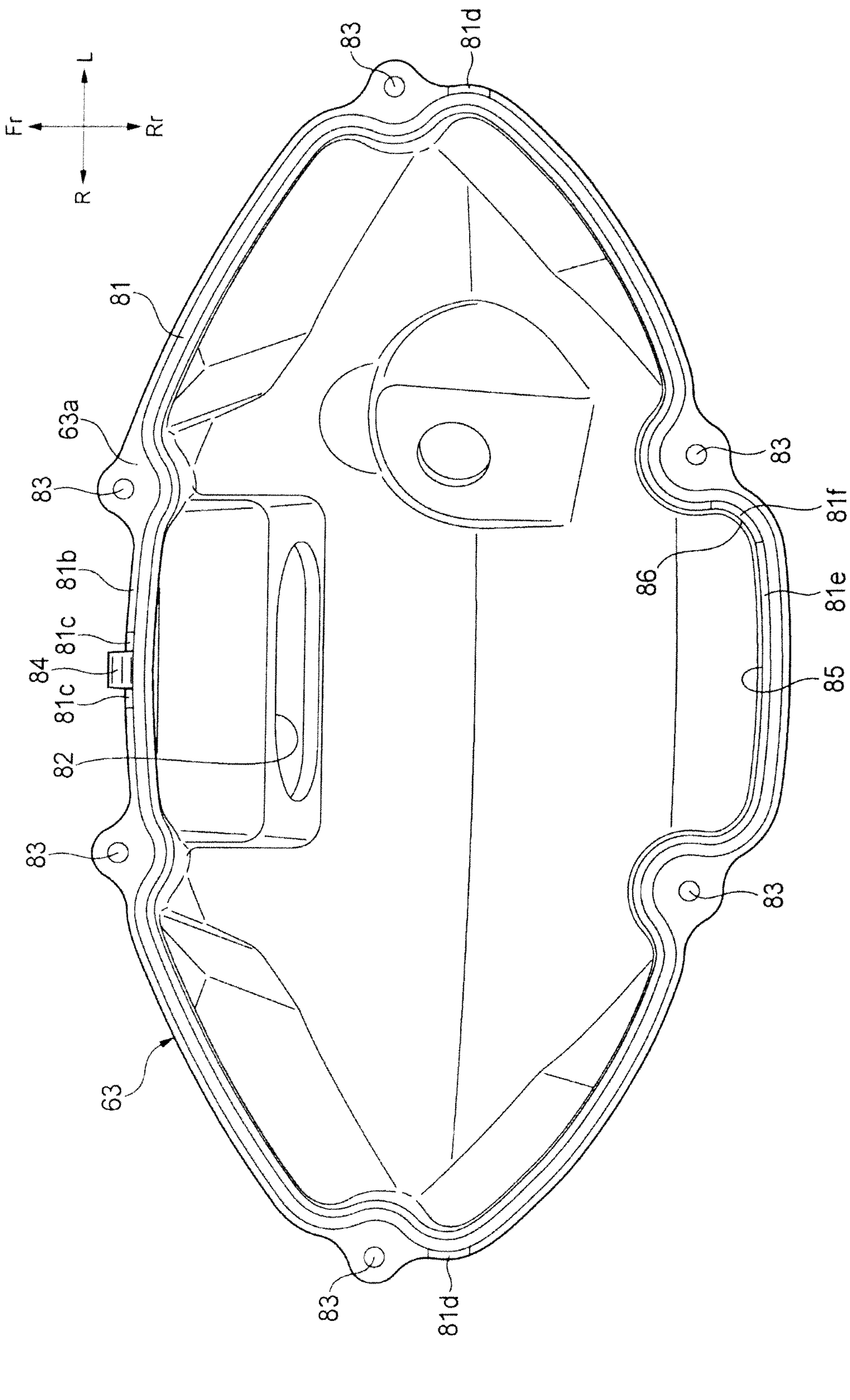
FIG. 6 shows a cover shown in FIG. 3, as viewed from the bottom.

Referring to FIGS. 3, 4, and 6, the cover 63 has a bottom and is shaped substantially into an ellipse in an upward-looking view. The cover 63 includes a fastening surface 63*a* to be fastened to the case main unit 62 on a peripheral edge portion thereof. The fastening surface 63*a* has a peripheral groove 81 in which an upper protruding portion 93*b* formed along a peripheral edge portion of the air cleaner element 64 to be described later is fitted. In FIG. 6, reference symbol 82 denotes a duct mounting hole for mounting the intake duct 66 and reference symbol 83 denotes six screw threadable portions for passing screws through the six internally threaded portions 73 in the case main unit 62.

Figure 7:
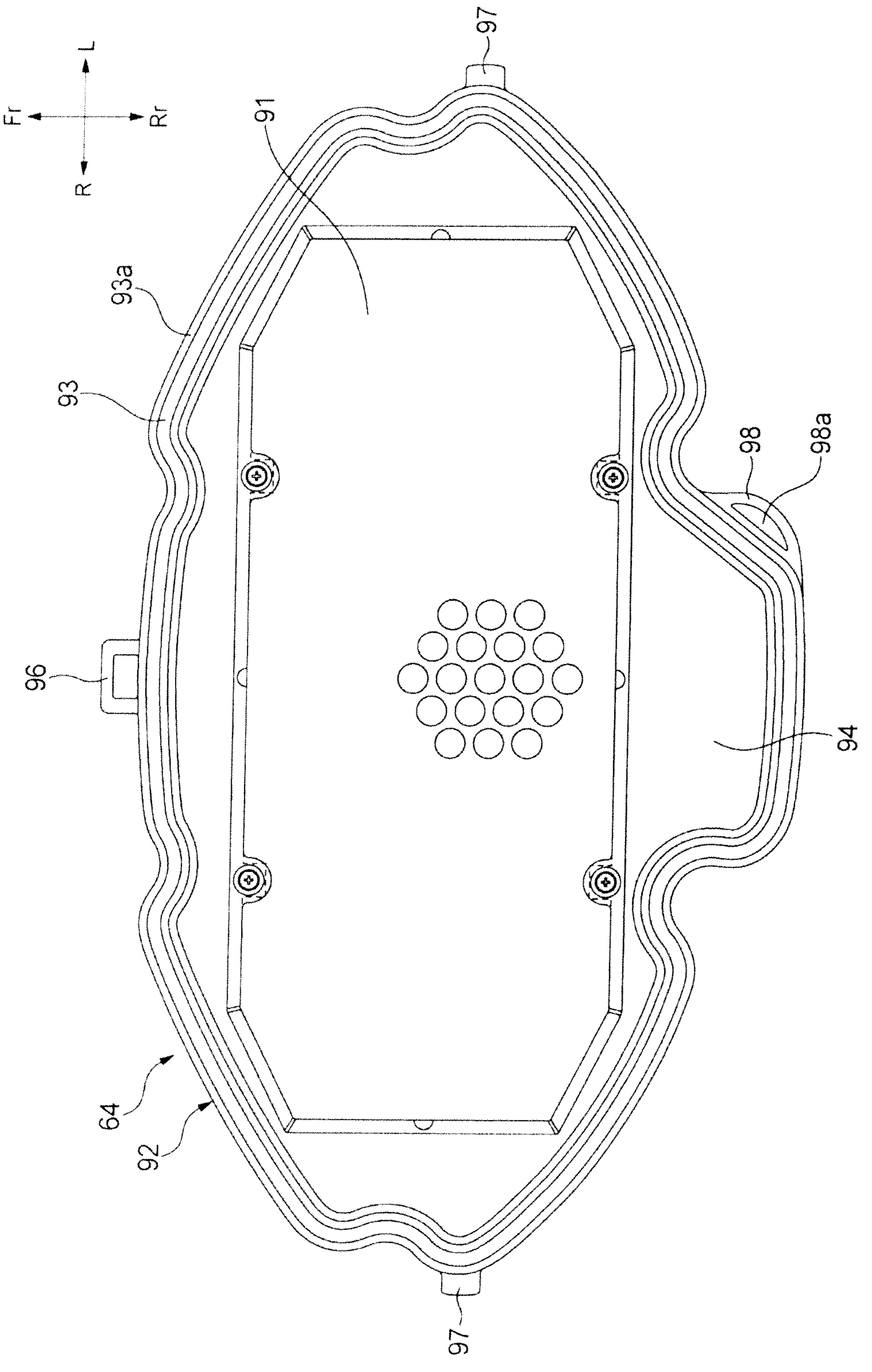
FIG. 7 shows an air cleaner element shown in FIG. 3, as viewed from the bottom.

Referring to FIGS. 3, 4, and 7, the air cleaner element 64 includes a filter portion 91 and a filter supporting unit 92. Specifically, the flat sheet-like filter portion 91 removes dust and dirt from the intake air. The filter supporting unit 92 supports the filter portion 91 in the air cleaner case 61.

The filter supporting unit 92 includes an outer frame portion (peripheral edge portion) 93, a tube portion 94, and an inner frame portion 95. Specifically, the outer frame portion 93 is a sheet-like member shaped to be fitted into the peripheral grooves 71, 81 in the case main unit 62 and the cover 63, respectively. The tube portion 94 extends upwardly from an inner peripheral portion of the outer frame portion 93. The inner frame portion 95 extends upwardly from an inner peripheral portion of the tube portion 94. The filter portion 91 is mounted inside the inner frame portion 95. The filter portion 91 is disposed by the filter supporting unit 92 on the side of the cover 63 relative to the fastening surfaces 62*a*, 63*a* of the case main unit 62 and the cover 63, respectively. Consequently, the air cleaner element 64 is disposed in a position biased on the side of the cover 63 relative to the fastening surfaces 62*a*, 63*a*.

In addition, the outer frame portion 93 includes the lower protruding portion 93*a* and the upper protruding portion 93*b* formed downwardly on a lower surface and upwardly on an upper surface, respectively, along an outer peripheral portion of the outer frame portion 93. Specifically, the lower protruding portion 93*a* is fitted into the peripheral groove 71 in the case main unit 62, while the upper protruding portion 93*b* is fitted into the peripheral groove 81 in the cover 63. Additionally, seals 71*a*, 81*a* inserted between the lower protruding portion 93*a* and the upper protruding portion 93*b* are fitted in bottom portions of the peripheral grooves 71, 81, respectively.

Referring to FIGS. 4 to 7, the outer frame portion 93 further has an engagement loop (holding portion) 96 formed to face the forward direction of the vehicle at a front central portion on the outer peripheral surface thereof. The cover 63 has an engagement hook (holding portion) 84 formed to face downwardly at a front central portion on the outer peripheral surface thereof near the fastening surface 63*a*. The engagement hook 84 is to be engaged with the engagement loop 96. Outer wall portions 71*b*, 81*b* that form the peripheral grooves 71, 81 of the case main unit 62 and the cover 63, respectively, have fitting recessed portions 71*c*, 81*c* that allow the engagement loop 96 to be engaged and fixed without interference each other. The fitting recessed portions 71*c*, 81*c* are disposed at positions corresponding to the engagement loop 96.

In addition, the outer frame portion 93 has holding protrusions (holding portions) 97, onto which an operator can hold his or her both hands, each being formed to face the outside in the vehicle width direction at a substantially central position on each side surface of the outer peripheral surface. The outer wall portions 71*b*, 81*b* that form the peripheral grooves 71, 81, respectively, have fitting recessed portions 71*d*, 81*d* that allow the holding protrusions 97 to be engaged and fixed without interference each other. The fitting recessed portions 71*d*, 81*d* are disposed at positions corresponding to the holding protrusions 97.

In the air cleaner device 60 according to the embodiment of the present invention, the cover 63 and the air cleaner element 64 are integrally held at three places when the engagement hook 84 is engaged with the engagement loop 96 and the operator holds onto the holding portions 97 with his or her both hands. This allows the cover 63 and the air cleaner element 64 to be integrally removed or reinstalled relative to the case main unit 62. More specifically, with the cover 63 and the air cleaner element 64 integrally held in position, the cover 63 and the air cleaner element 64 are raised such that the lower protruding portion 93*a* of the air cleaner element 64 is disengaged from the peripheral groove 71 in the case main unit 62 and are slidingly moved in the vehicle width direction.

Referring to FIGS. 5 to 7, the cover 63 includes a recessed portion 85 formed at a rear portion thereof between the screw threadable portions 83. The recessed portion 85 includes a drain portion 86 for discharging drain, disposed on an inner surface at the left corner thereof. Additionally, the outer frame portion 93 of the air cleaner element 64 includes a protruding tab 98 formed on an outer peripheral surface thereof at a position corresponding to the drain portion 86. The protruding tab 98 has a drain hole 98*a* that communicates with the drain portion 86. In addition, the fastening surface 62*a* of the case main unit 62 has a drain hole 74 at a position corresponding to the drain portion 86. The drain hole 74 communicates with the drain portion 86 and the drain hole 98*a*. Therefore, the drain portion 86, the drain hole 98*a*, and the drain hole 74 communicate with each other and are formed along the vertical direction on the left side of the vehicle where the rear end portion of the air cleaner case 61 and the side stand 42 are disposed. Further, an inner wall portion 81*e* that forms the peripheral groove 81 of the cover 63 has a recessed portion 81*f* disposed at a position corresponding to the protruding tab 98, in which the protruding tab 98 is to be fitted.

Referring to FIG. 2, a storage box 100 is disposed rearwardly of the air cleaner case 61 and upwardly of the pair of left and right center frames 14. The storage box 100 includes a box main unit 101 and a lid portion 102. Specifically, the box-like box main unit 101 is fixed to the pair of left and right center frames 14. The lid portion 102 opens or closes the box main unit 101. The lid portion 102 is to be swung open or closed about a hinge 103 disposed at an upper end of a rear portion of the box main unit 101. The storage box 100 has a capacity of being able to store, at least, a full face helmet 26.

A lock mechanism accommodating portion 104 can be disposed in this example in a forwardly protruding condition at a front end of an upper portion of the storage box 100. The lock mechanism accommodating portion 104 accommodates a lock mechanism not shown for locking or unlocking the lid portion 102. The air cleaner case 61 has an upper portion and a rear portion disposed downwardly of the lock mechanism accommodating portion 104 in a perpendicular direction. This arrangement allows a storage space inside the storage box 100 to be increased, as compared with an arrangement in which the lock mechanism is housed inside the box main unit 101.

Additionally, the air cleaner case 61 can be disposed in a position inclined relative to a front surface of the storage box 100 in a vehicle side view. A battery 110, a fuse box 111, and an inclination sensor 112 as electrical components are disposed between a rear surface of the air cleaner case 61 and the front surface of the storage box 100.

As described heretofore, the air cleaner device 60 according to one embodiment of the present invention can include the air cleaner element 64 formed in a position biased on the side of the cover 63 relative to the fastening surfaces 62*a*, 63*a* of the case main unit 62 and the cover 63. The air cleaner case 61 also allows the cover 63 and the air cleaner element 64 to be integrally removed or reinstalled relative to the case main unit 62. Therefore, even if there is little space available upwardly of the cover 63 and accordingly the cover 63 cannot be raised, the cover 63 and the air cleaner element 64 can be removed or reinstalled relative to the case main unit 62 by simply slidingly moving the cover 63 and the air cleaner element 64 integrally in the width direction. This eliminates the need for having a large space for servicing around the air cleaner case 61, so that the parts can be compactly disposed. The motorcycle 10 can therefore be prevented from becoming unnecessarily large in size, and maintainability of the air cleaner device 60 can be improved.

In the air cleaner device 60 according to one embodiment of the present invention, the cover 63 and the air cleaner element 64 are integrally held at three places of the engagement hook 84 and the engagement loop 96, and the holding protrusions 97, 97 and the fitting recessed portions 81*d*, 81*d*. The cover 63 and the air cleaner element 64 can therefore be even more reliably removed or reinstalled relative to the case main unit 62, while preventing the cover 63 and the air cleaner element 64 from deviating from each other.

In the air cleaner device 60 according to one embodiment of the present invention, the engagement hook 84 and the engagement loop 96 as the holding portions are disposed at the central portion on the front surface of the cover 63 and the air cleaner element 64. The holding protrusions 97, 97 and the fitting recessed portions 81*d*, 81*d* as the holding portions can be disposed on the left and right side surfaces of the cover 63 and the air cleaner element 64. This can allow the operator to slidingly move the cover 63 and the air cleaner element 64 by supporting with his or her both hands the holding protrusions 97, 97 and the fitting recessed portions 81*d*, 81*d* on both sides, with the cover 63 and the air cleaner element 64 engaged with each other using the engagement hook 84 and the engagement loop 96 at the front central portion. This achieves good maintainability of the air cleaner device 60 without needing a large space for servicing around the air cleaner case 61.

In the air cleaner device 60 according to one embodiment of the present invention, the cover 63 can have the drain portion 86 for discharging fluid, disposed at a part of the peripheral edge portion thereof and the air cleaner element 64 and the case main unit 62 have the drain holes 98*a*, 74 that communicate with the drain portion 86, disposed in the peripheral edge portions thereof. Fluid can therefore be efficiently drained or discharged without having to incorporate a drain part separately. In addition, the drain portion 86 or the drain hole 98*a*, 74 disposed in the peripheral edge portion of the cover 63, the air cleaner element 64, or the case main unit 62 imposes no restriction on the size of the filter portion 91 disposed at the central portion of the air cleaner element 64.

In the air cleaner device 60 according to one embodiment of the present invention, the air cleaner case 61 can be disposed in an inclined position such that the rear portion thereof is disposed downwardly of the front portion thereof and the drain portion 86 and the drain holes 98*a*, 74 are disposed at the rear portion of the air cleaner case 61. This allows fluid in the air cleaner case 61 to be efficiently collected in the rear portion thereof. Fluid can therefore be efficiently discharged by disposing the minimum essential drain portion 86 and the drain holes 98*a*, 74 in the rear portion of the air cleaner case 61.

In the air cleaner device 60 according to one embodiment of the present invention, the side stand 42 can be disposed on the left side of the vehicle and the drain portion 86 and the drain holes 98*a*, 74 are disposed on the same side as the side stand 42. When the side stand 42 is deployed, the motorcycle 10 is inclined to the side of the side stand 42 and the air cleaner device 60 is also inclined to the side of the side stand 42. As compared with an arrangement in which the drain portion 86 and the drain holes 98*a*, 74 are disposed on the side opposite to the side stand 42, draining performance can be improved.

In the air cleaner device 60 according to one embodiment of the present invention, the storage box 100 can be disposed rearwardly of the air cleaner case 61 and the air cleaner case 61 is disposed downwardly in the perpendicular direction of the lock mechanism accommodating portion 104 disposed at the front end of the upper portion of the storage box 100. Therefore, the air cleaner case 61 can be compactly disposed without allowing the same to protrude upwardly from the storage box 100, while a storage space is secured in the storage box 100. This makes for improved design efficiency and appearance.

DESCRIPTION OF REFERENCE SYMBOLS

10: Motorcycle
30: Engine
42: Side stand
60: Air cleaner device
61: Air cleaner case
62: Case main unit
62*a*: Fastening surface (peripheral edge portion)
63: Cover
63*a*: Fastening surface (peripheral edge portion)
64: Air cleaner element
74: Drain hole
81*b*: Outer wall portion
81*d*: Fitting recessed portion (holding portion)
84: Engagement hook (holding portion)
86: Drain portion
92: Filter supporting unit
93: Outer frame portion (peripheral edge portion)
96: Engagement loop (holding portion)
97: Holding protrusion (holding portion)
98: Protruding tab
98*a*: Drain hole
65: Intake tube (intake path)
66: Intake duct
100: Storage box

We claim:

1. An air cleaner device, comprising:
an air cleaner case including a case main unit and a cover;
an intake duct disposed on the cover;
an intake path disposed on the case main unit, and configured to be connected to an engine; and
an air cleaner element formed in a position biased on a side of the cover relative to fastening surfaces of the case main unit and the cover,
wherein the cover and the air cleaner element are integrally removable relative to the case main unit,
wherein the air cleaner case is configured to be mounted in a vehicle, forwardly of a storage box configured to removably store a helmet, and wherein the air cleaner case is disposed downwardly in a perpendicular direction of a front end of an upper portion of the storage box, and
wherein from a top view of the case main unit, the case main unit has a substantially elliptical shape having a length in a vehicle length direction, and having a width in a vehicle width direction that is greater than the length.

2. The air cleaner device according to claim 1, further comprising a plurality of holding portions for integrally holding the cover and the air cleaner element.

3. The air cleaner device according to claim 2, wherein the holding portions are disposed in at least three locations.

4. The air cleaner device according to claim 2, wherein the holding portions are disposed, relative to a mounting location in a vehicle, at a front surface central portion and left and right side surfaces of the cover and the air cleaner element.

5. The air cleaner device according to claim 1, wherein the cover includes a drain portion disposed at a peripheral edge portion thereof, the drain portion configured to discharge fluid, and
wherein the air cleaner element and the case main unit include a drain holes formed in peripheral edge portions thereof, the drain holes communicating with the drain portion in the cover.

6. The air cleaner device according to claim 5, wherein the air cleaner is disposed, relative to a mounting position in a vehicle, in an incline position such that a rear portion thereof is disposed downwardly of a front portion thereof, and
wherein the drain portion and the drain holes are disposed at a rear portion of the air cleaner case.

7. The air cleaner device according to claim 5, wherein the air cleaner device is configured to be mounted on a vehicle having a side stand disposed on one side thereof in a vehicle width direction, and
wherein the drain portion and the drain holes are disposed on a same side as the side stand.

8. An air cleaner device comprising:
case means for housing an air cleaner element therein;
intake means disposed on said case means for guiding intake air therethrough, said intake means also for being connected to an engine;
an air cleaner element for filtering air, said air cleaner element formed in a position biased on a side of said case means relative to fastening surfaces of the case means, wherein a part of the case means and the air cleaner element are integrally removable from another part of the case means,
wherein the case means is configured to be mounted in a vehicle, forwardly of a storage box configured to removably store a helmet, and wherein the case means is disposed downwardly in a perpendicular direction of a front end of an upper portion of the storage box, and
wherein from a top view of the case means, the case means has a substantially elliptical shape having a length in a vehicle length direction, and having a width in a vehicle width direction that is greater than the length.

9. A vehicle, said vehicle comprising:
a frame;
an engine attached to said frame; and
an air cleaner device, said air cleaner device including an air cleaner case having a case main unit and a cover, an intake duct disposed on the cover, and an intake path disposed on the case main unit, said intake path connected to said engine, and an air cleaner element formed in a position biased on a side cover relative to fastening surfaces of the case main unit and the cover; and
a storage box, configured to removably store a helmet, attached to said frame, wherein the air cleaner case is disposed forwardly of the storage box, and downwardly in a perpendicular direction of a front end of an upper portion of the storage box, wherein the cover and the air cleaner element are integrally removable relative to the case main unit, and wherein from a top view of the case main unit, the case main unit has a substantially elliptical shape having a length in a vehicle length direction, and having a width in a vehicle width direction that is greater than the length.

10. The vehicle according to claim 9, wherein:

holding portions are disposed on the cover and the air cleaner element, said holding portions being disposed at a front surface central portion and left and right side surfaces of the cover and the air cleaner element.

11. A vehicle according to claim 9, wherein the air cleaner case is disposed in an incline position such that a rear portion thereof is disposed downwardly of a front portion thereof, and wherein the cover has a drain portion disposed at a part of a peripheral edge thereof, and the air cleaner element and case main unit include a drain holes formed in peripheral edge portions thereof, the drain holes communicating with the drain portion, wherein the drain portion and the drain holes are disposed at a rear portion of the air cleaner case.

12. The vehicle according claim 11, further comprising:

a side stand disposed on one side thereof in a vehicle width direction, wherein the drain portion and the drain holes are disposed on a same side as the side stand.

* * * * *